(12) United States Patent
Yajima et al.

(10) Patent No.: US 6,825,587 B2
(45) Date of Patent: Nov. 30, 2004

(54) ROTOR MOTOR WITH A RESIN COIL BOBBIN

(75) Inventors: Katsuhide Yajima, Nagano (JP); Hitoshi Mutai, Nagano (JP); Toshio Yamamoto, Nagano (JP)

(73) Assignee: Kabushiki Kaisha Sankyo Seiki Seisakusho, Nagano (JP)

(*) Notice: Subject to any disclaimer, the term of this patent is extended or adjusted under 35 U.S.C. 154(b) by 0 days.

(21) Appl. No.: 09/987,086

(22) Filed: Nov. 13, 2001

(65) Prior Publication Data

US 2002/0057028 A1 May 16, 2002

(30) Foreign Application Priority Data

Nov. 13, 2000 (JP) ........................................ P. 2000-345216

(51) Int. Cl.⁷ .............................. H02K 5/16; H02K 7/08
(52) U.S. Cl. .................. 310/90; 310/49 R; 310/40 MM
(58) Field of Search ................................. 310/49 R, 90, 310/40 MM, 90.5, 43

(56) References Cited

U.S. PATENT DOCUMENTS

| | | | | |
|---|---|---|---|---|
| 4,308,478 A | * | 12/1981 | Mertz | 310/90 |
| 4,471,246 A | * | 9/1984 | Paillet | 310/42 |
| 4,792,245 A | * | 12/1988 | Fuke et al. | 384/610 |
| 5,043,613 A | * | 8/1991 | Kurata et al. | 310/49 R |
| 5,168,186 A | * | 12/1992 | Yashiro | 310/47 |
| 5,187,400 A | * | 2/1993 | Kurata | 310/49 R |
| 5,399,025 A | * | 3/1995 | Higuchi et al. | 384/428 |
| 5,465,020 A | * | 11/1995 | Peterson | 310/194 |
| 5,486,054 A | * | 1/1996 | Nagata et al. | 384/610 |
| 5,677,584 A | * | 10/1997 | Keck | |
| 5,747,897 A | * | 5/1998 | Iwasa et al. | 310/49 R |
| 5,798,589 A | * | 8/1998 | Ohi et al. | 310/90 |
| 5,886,438 A | * | 3/1999 | Kawanishi | 310/90 |
| 6,255,749 B1 | * | 7/2001 | Aoshima et al. | 310/49 R |
| 6,333,579 B1 | * | 12/2001 | Hirano et al. | 310/194 |
| 2002/0084709 A1 | | 7/2002 | Yajima et al. | |

FOREIGN PATENT DOCUMENTS

JP 64-3030436 * 12/1989 .......... H02K/5/167

* cited by examiner

Primary Examiner—Burton S. Mullins
Assistant Examiner—Heba Yousri M. Elkassabgi
(74) Attorney, Agent, or Firm—Sughrue Mion, PLLC

(57) ABSTRACT

The present invention provides a motor having an urging member for urging a rotor disposed oppositely to a stator in the axial direction, in which the rotor is rotated in a state under an urging force of the urging member, characterized in that a positional regulation part (bearing) for regulating the position of the rotor in a thrust direction under the urging force is integrally provided in a coil bobbin made of resin which has metallic stator cores making up the stator formed by insert molding. Therefore, the positional accuracy of the positional regulation part (bearing) with respect to the stator is made better. Thereby, the positional accuracy of the rotor with respect to the stator is also improved, so that the torque up is enabled.

4 Claims, 2 Drawing Sheets

X1 → URGING DIRECTION

ROTOR MOTOR WITH A RESIN COIL BOBBIN

CROSS REFERENCE TO RELATED APPLICATION

The present application is based on Japanese Patent Application No 2000-345216, the entire contents of which are incorporated herein by reference.

BACKGROUND OF THE INVENTION

1. Field of the Invention

The present invention relates to improvements in a motor rotating a rotor while urging the rotor in the axial direction.

2. Related Art

FIG. 2 shows the conventional structure of a rotor portion for a motor that rotates a rotor 52 while urging a shaft 51 to one side in the axial direction (a direction of the arrow X1 in FIG. 2). The shaft 51 of the rotor 52 is rotatably supported at two places by metal bearings (not shown). One of the two metal bearings for bearing the shaft 51 is attached to the fixture such as a motor case. And the metal bearing attached to this fixture also serves as a thrust pad for receiving one face of the rotor 52 that is urged to one side in the axial direction owing to an urging force.

The motor rotating the rotor 52 while urging it to one side in the axial direction are usually provided with a plurality of washers 53 including a spring washer for urging the rotor 52 to the side of the bearing that is attached to the fixture. That is, the plurality of washers 53 are disposed between an end portion of a main body 52a of the rotor 52 and the bearing not acting as the thrust pad, in which one or two of the plurality of washers 53 are composed of a washer having resilient nature. Thereby, the rotor 52 is pressed to the side of the bearing serving as the thrust pad, and rotates at a predetermined location.

The motor of this type as described above has a structure of rotating the rotor 52 while urging it onto the bearing, using a spring force of the washer 53, to make the rotational position of the rotor 52 relative to a stator (not shown) unchanged on the side where the rotor is urged. However, it is required to dispose a plurality of washers 53 to reduce the friction and wear in various parts. As a result, the dimensional tolerances of the thickness of washers 53 are accumulated, and the positional accuracy of the rotor 52 with respect to the bearing is not always excellent. Consequently, there is a problem that the urging force is greatly dispersed.

Also, the fixture to which the bearing also serving as the thrust pad is attached and the stator are separately provided. Therefore, a dimensional error or attaching error may occur between the fixture and the stator. As a result, the bearing also serving as the thrust pad and acting as the rotational positional regulation part of the rotor has a poor positional accuracy with respect to the stator, leading to a problem that the positional accuracy of rotation of the rotor 52 with respect to the stator is further aggravated.

SUMMARY OF THE INVENTION

In the light of the above problems, it is an object of the present invention to provide a motor rotating a rotor in a state of urging the rotor to one bearing side, thereby improving the positional accuracy of rotation of the rotor with respect to a stator and stabilizing an urging force.

In order to accomplish the above object, the present invention provides a motor having an urging member for urging a rotor disposed oppositely to a stator in the axial direction, the motor rotating the rotor in a state under an urging force of the urging member, characterized in that a positional regulation part for regulating the position of the rotor in a thrust direction under the urging force is integrally provided in a coil bobbin made of resin which has metallic stator cores making up the stator formed by insert molding. Therefore, the positional accuracy between the positional regulation part for regulating the thrust position of the rotor and the parts making up the stator, specifically, the stator core and the coil bobbin, can be easily attained, whereby the positional accuracy of rotation of the rotor with respect to the stator is made better. Therefore, the output torque is improved.

Further, the invention provides the motor characterized in that a bearing for rotatably receiving one end of a shaft of the rotor is provided as a slide bearing that is movable in the axial direction, in which a holding portion for holding the slide bearing movably in the axial direction is provided integrally with the coil bobbin, and the urging member is attached to the holding portion. Therefore, the positional accuracy of holding the urging member for urging the slide bearing for receiving the rotor with respect to the coil bobbin is assured, thereby making it easier to control the urging force to urge the rotor. As a result, the rotor is not pressed against the positional regulation part too strongly, or too weakly, and thereby can be rotated in a state of the excellent positional accuracy.

Also, the invention provides the motor characterized in that the positional regulation part is provided in a bearing for bearing the other end of the shaft of the rotor. Therefore, the structure is simplified and more easily manufactured.

Also, the invention provides the motor characterized in that the positional regulation part accepts indirectly an urging force of the urging member via a washer made of resin. Therefore, the positional regulation part formed integrally with the coil bobbin made of resin and the washer made of resin slide with each other, resulting in less sliding loss.

Further, the invention provides the motor characterized in that the other end of the shaft of the rotor is protruded from the bearing, and a lead screw portion is formed in the protruded portion. Conventionally, the motor of this type has, on one end of the stator, the bearing and the urging means for urging the rotor from one end to the other end of the stator, with a U-shaped frame connected to the other end of the stator. The bearing is placed on the opposite side of a connected portion of this frame with the stator to accept the urging force of the urging means. In this manner, when the bearing is disposed via the frame, a piling error of the frame is added, so that the axial accuracy in the thrust direction is naturally worse. In this invention, the positional regulation part is provided in the bearing for receiving the other end portion of the shaft of the rotor, whereby the axial accuracy in the thrust direction can be attained. Also, since the U-shaped frame is not necessitated, the structure can be made compact, and has a greater degree of freedom in design without imposing restrictions on the mounting space on other devices.

DETAILED DESCRIPTION OF THE PREFERRED EMBODIMENT

Figure 1:
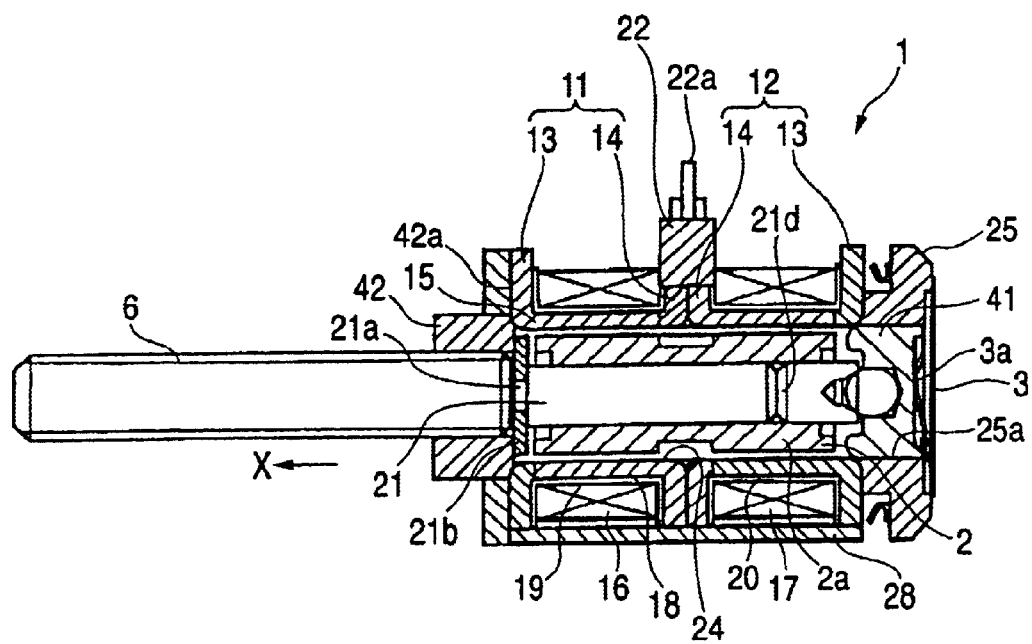
FIG. 1 is a cross-sectional view showing an entire constitution of a motor according to an embodiment of the present invention.
Figure 2:
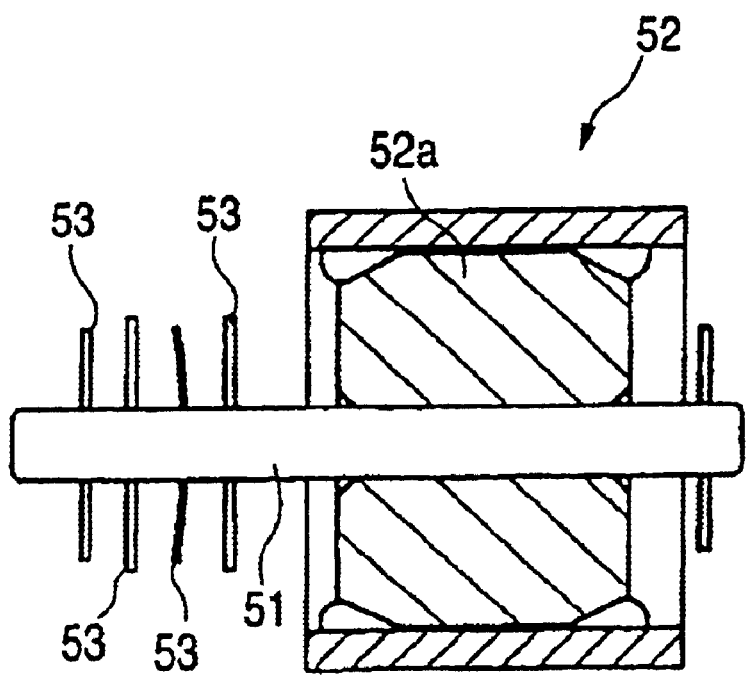
FIG. 2 is a cross-sectional view showing a peripheral portion of a rotor that is a main part of the conventional motor.

The preferred embodiments of the present invention will be described below. FIG. 1 is a cross-sectional view of an entire motor according to an embodiment of the present invention.

As shown in FIG. 1, a motor according to this embodiment of the invention (which is a stepping motor but simply referred to as a motor) has a stator 1 and a rotor 2 disposed oppositely the stator 1. The rotor 2 is rotated while being urged in the axial direction (more specifically in a direction of the arrow X as indicated in FIG. 1) by an urging member 3. Also, a shaft 21 of the rotor 2 has one end penetrated and protruded through a bearing 41 formed integrally with the stator 1, with a lead screw portion 6 formed in this penetrated and protruded portion.

The stator 1 has two sets of metallic stator cores 11 and 12 superposed in the axial direction, and the rotor 2 is disposed rotatably inside the stator 1. Each of the stator cores 11 and 12 is composed of an outer yoke 13 disposed outside in the axial direction in a superposed state, and an inner yoke 14 disposed adjacently in the axial direction in the superposed state. Both the yokes 13 and 14 are composed of a magnetic metal member, and on its inner peripheral side, pole teeth 15 are provided, and are disposed oppositely on an outer peripheral face for a magnet portion 2a of the rotor 2.

Two sets of the outer yoke 13 and the inner yoke 14 are formed by insert molding integrally with the coil bobbin 18 made of resin that winds the coils 16 and 17, and there is a coil space for winding the coils 16 and 17 between a pair of the inner yoke 14 and the outer yoke 13 correspondingly provided. The coil bobbin 18 has the coil incorporating portions 19 and 20 for winding the coils 16 and 17, respectively, and comprises a hole portion 24 for surrounding the rotor 2 on an inner peripheral portion. The pole teeth 15 have the surfaces exposed within the hole portion 24 to be opposed to the magnet portion 2a of the rotor 2 as will be described later.

A winding start part and a winding end part of the coils 16 and 17 wound around the coil incorporating portions 19 and 20 of the coil bobbin 18 are entangled at a terminal pin 22a stood in a terminal portion 22, respectively. This terminal portion 22 is molded integrally with the coil bobbin 18, and extended outwards radially from an opening portion of a metallic case member 28.

Further, the stator 1 is extended to the right in FIG. 1, and has a cap portion 25 protruded axially from an opening portion of the case member 28 that is located in the axial direction. This cap portion 25 is disposed on the rear end side of the rotor 2, and has a circular hole 25a for holding a slide bearing 41 for supporting a rear end (i.e., a right end portion in FIG. 1) of the shaft 21 for the rotor 2 movably in the axial direction, after the rotor 2 is inserted into the stator 1, as will be described later. When assembling, this hole 25a is an entry portion for inserting the rotor 2 into the stator 1. The cap portion 25 thus constituted is molded integrally with the coil bobbin 18 as described above, and the hole 25a of this cap portion 25 constitutes a series of holes continuous to the hole portion 24.

The hole 25a of the cap portion 25, after the slide bearing 41 is fitted therein, has the urging member 3 fitted and held therein with a leaf spring 3a for urging the slide bearing 41 to the side of the bearing 42 by making contact with the rear end portion of the slide bearing 41. That is, the slide bearing 41 for supporting the rear end of the shaft 21 of the rotor 2 is disposed between the urging member 3 and the shaft 21. And the urging member 3 urges the rotor 2 to the side of the bearing 42 to press the shaft 21 against the bearing 42 by applying an urging force to the slide bearing 41 toward the side of the bearing 42 at any time, whereby the rotation of the rotor 2 is stabilized. That is, the cap portion 25 is a holding portion for holding this urging member 3.

In this embodiment, the urging force of the lead spring 3a for urging the slide bearing 41 is employed, but a plurality of washers including a spring washer are not superposed as conventionally. Therefore, the number of washers can be reduced more greatly than the conventional motor, so that the tolerances of the thickness of washers are not accumulated axially. Accordingly, the urging force for urging the rotor 2 is stabilized.

On a left-hand end face of one outer yoke 13 of the stator 1 in FIG. 1, a bearing holding surface 42a is disposed, and the bearing 42 is disposed at the center of this bearing holding surface 42a. This bearing 42 and the bearing holding surface 42a are molded of resin integrally with the coil bobbin 18 made of resin.

The bearing 42 is a radial bearing for rotatably supporting the shaft 21 of the rotor 2, as well as a positional regulation part for regulating the position of the rotor 2 in a direction to the thrust position under the urging force from the urging member 3.

Therefore, if the rotor 2 is urged in the direction of the arrow X in FIG. 1 by the urging force of the urging member 3, a C-type washer 21b made of resin that is fitted into a narrow portion 21a of the shaft 21 of the rotor 2 is pressed against the end face of the bearing 42. That is, the outer diameter of the C-type washer 21b is made to be larger than the bore diameter of the bearing 42, and when the rotor 2 is moved in the direction of the arrow X, the end face of the C-type washer 21b is pressed against the end face of the bearing 42. With this constitution, the bearing 42 accepts the urging force of the urging member 3 indirectly via the C-type washer 21b made of resin.

In this way, the bearing 42 also serving as the positional regulation part of the rotor 2 is made of resin and formed integrally with the coil bobbin 18, and integrated with the stator 1. That is, this motor has the positional regulation part for regulating the thrust position of the rotor 2 integral with the stator 1, easily giving a high positional accuracy of the positional regulation part with respect to the stator 1.

Though in this embodiment, the bearing 42 is the thrust positional regulation part of the rotor 2, the positional regulation part of the rotor 2 may be provided integrally with the stator 1, separately from the bearing 42. In this case, the bearing 42 may not be integrated with the stator 1.

Within the hole portion 24 of the stator 1, the rotor 2 is rotatably disposed. This rotor 2 has a magnet portion 2a disposed oppositely the pole teeth 15 of the stator 1, and a metallic shaft 21 inserted into the rotational central hole of the magnet portion 2a and fixed by adhesion with one end side protruded from an axial end face of the magnet portion 2a. In apart of the shaft 21 disposed inside the magnet portion 2a, an adhesive reserving groove 21d is formed. The shaft 21 may be fixed by press-fit or adhesion without providing this adhesive reserving groove 21d.

The narrow portion 21a is formed between the part of the shaft 21 disposed inside the magnet portion 2a and the lead screw portion 6, and has the C-type washer 21b made of resin fitted therein. Also, the lead screw portion 6 is formed around the outer periphery of a part of the shaft 21 protruded from the magnet portion 2a and on a leading end side from the narrow portion 21a. This lead screw portion 6 is mated with a screw portion of a head member, not shown, and when the lead screw portion 6 is rotated, this head portion is movable to the left or right in FIG. 1.

This rotor 2 is assembled by inserting it into the hole portion 24 from the side of the cap portion 25 of the stator 1, beginning with the side where the lead screw portion 6 is formed. That is, the top end of the shaft 21 of the rotor 2 on the side of the lead screw portion 6 is inserted into the hole 25a of the cap portion 25 so that the top end of the lead screw portion 6 is passed through the hole portion 24 and the bearing 42. And most of the lead screw portion 61 is protruded from the bearing 42.

Thereafter, in this state, the slide bearing 41 is inserted into the hole 25a of the cap portion 25, and the urging member 3 is covered over the cap portion 25 while bringing the leaf spring 3a into contact with the rear end side of this slide bearing 41, so that the motor can be assembled. And in the motor assembled in this manner, the rotor 2 is rotated around the shaft 21 under the support by the bearings 41 and 42, while being urged to the side of the bearing 42, if an electric current is supplied to the coils 16 and 17 of the stator 1, whereby the head member mated with the lead screw portion 6 is moved axially by the rotation of the rotor 2.

The invention as described above provides two stator cores 11 and 12 superposed axially that are integrated with the coil bobbin 18 by insert molding. And in FIG. 1, the bearing 42 disposed to the left is the positional regulation part for regulating the rotational position of the rotor 2 in the thrust direction under an urging force in the direction of the arrow X, with this bearing 42 being integrally molded with the coil bobbin 18. Further, the cap portion 25 as the holding portion that holds the urging member 3 for urging the rotor 2 in the direction of the arrow X is molded integrally with the coil bobbin 18.

Therefore, the positional accuracy of the positional regulation part with respect to the stator 1, and the positional accuracy of the urging member 3 with respect to the stator 1 can be increased. As a result, the accuracy of the rotor 2 with respect to the stator 1, particularly, the rotational position accuracy of the pole teeth 15 with respect to the stator 1, can be made more excellent. That is, there is no shortcoming that the accuracy of rotational position of the rotor 2 with respect to the stator 1 is degraded due to the accumulation of assembling errors in assembling the members. By improving the rotational position accuracy of the rotor 2 with respect to the stator 1, it is possible to reduce the magnetic loss between the rotor 2 and the pole teeth 15, whereby the torque of the motor can be increased. On the contrary, if there is no need for increasing the torque of the motor, the magnet may be reduced in size, whereby the material costs can be decreased.

Though the preferred embodiment of the invention has been described above, the invention is not limited thereto. The embodiment may be modified in various ways without departing from the spirit or scope of the invention. For instance, the metallic stator cores 11 and 12 are incorporated by insert molding into the coil bobbin 18 made of resin in the above embodiment, but other methods than the insert molding may be employed or the coil bobbin 18 may be made of another material.

Though in the above embodiment, the cap portion 25 that is the holding portion for holding the slide bearing 41 is formed integrally with the coil bobbin 18, the cap portion 25 may be formed separately, when the cap portion 25 is not required to have too high positional accuracy with respect to the stator 1. Even with such constitution, the urging member 3 urges the rotor 2 toward the side of the bearing 42 to receive the rotor 2, the positional accuracy of the rotor 2 with respect to the bearing 42 is excellent. Accordingly, the positional accuracy of the rotor 2 with respect to the stator 1 integrally formed with the bearing 42 is also excellent.

Though in the above embodiment, the rotor 2 trying to slide in the axial direction due to an urging force of the urging member 3 is regulated in position by the bearing 42 indirectly via the C-type washer 21b made of resin, the rotor 2 may be directly received by the bearing 42 without having the C-type washer 21b. Also, the shape of washer may be like a ring, but not the C-type. Further, the washer 21b is not made of resin, but may be made of other materials including metal. Also, the washer is not fitted into the shaft, but a convex portion projecting radially may be provided at a certain position of the shaft 21, such that an end face of this convex portion slides with the bearing 42 when the rotor 2 is rotated. Moreover, the washer is not fitted into the shaft 21, but may be put between the bearing 42 and the rotor 2.

As described above, the present invention provides a motor having an urging member for urging a rotor disposed oppositely to a stator in the axial direction, the motor rotating the rotor in a state under an urging force of the urging member, characterized in that a positional regulation part for regulating the position of the rotor in a thrust position direction under the urging force is integrally provided in a stator. Therefore, the positional accuracy between the positional regulation part for regulating the thrust position of the rotor and the stator can be easily attained, whereby the positional accuracy of rotation of the rotor with respect to the stator is made better. Consequently, the rotational torque and the assembling can be improved. When the torque up is unnecessary, the volume of a rotor magnet can be decreased, and the manufacturing costs suppressed.

What is claimed is:

1. A motor comprising:
    a stator provided with a resin coil bobbin formed by insert molding having at least two metallic stator cores, said cores being stacked in an axial direction of the motor, and each core having an outer yoke and an inner yoke;
    a rotor accommodated in said stator, said rotor being rotated while being urged by an urging member in the axial direction of said rotor;
    a positional regulation part, located on one side face of said stator, integrally formed with said resin coil bobbins by insert molding, and
    a support portion, integrally formed with said resin coil bobbins by insert molding, constituted by a cap portion having a circular hole on which a slide bearing is positioned; and
    a slide bearing movable in the axial direction of said rotor and rotatable receiving one end of a shaft of said rotor;
    wherein the support portion is located on another side face of the stator, and supports said slide bearing,
    wherein the positional regulation part and the support portion regulate the position of the rotor both in the thrust and radial direction;
    wherein the support portion holds said slide bearing and is provided integrally with said coil bobbin, and said urging member is attached to said support portion;
    wherein said positional regulation part is constituted by a bearing provided at the other end of said shaft, and
    wherein said positional regulation part accepts indirectly an urging force of said urging member via a washer made of resin.

2. A motor according to claim 1, wherein the other end of said shaft is protruded from said bearing, and a lead screw portion is formed in said protruded portion.

3. A motor comprising:
- a stator provided with a resin coil bobbin formed by insert molding having at least two metallic stator cores, each core having an outer yoke and an inner yoke;
- a rotor accommodated in said stator, said rotor being rotated while being urged by an urging member in the axial direction of said rotor, said rotor being disposed inside said at least two cores;
- a positional regulation part, located on one side face of said stator, integrally formed with said resin coil bobbins by insert molding,
- a support portion, integrally formed with said resin coil bobbins by insert molding constituted by a cap portion having a circular hole on which a slide bearing is positioned; and
- a slide bearing movable in the axial direction of said rotor and rotatable receiving one end of a shaft of said rotor, wherein said support portion is located on another side face of the stator, and supports said slide bearing, wherein the positional regulation part and the support portion regulate the position of the rotor both in the thrust and radial direction;

wherein a holding portion for holding said slide bearing is provided integrally with said coil bobbin, and said urging member is attached to said holding portion, wherein said positional regulation part is constituted by a bearing provided at the other end of said shaft, and wherein said positional regulation part accepts indirectly an urging force of said urging member via a washer made of resin.

4. A motor according to claim 3, wherein the other end of said shaft is protruded from said bearing, and a lead screw portion is formed in said protruded portion.

* * * * *